Figure 1:
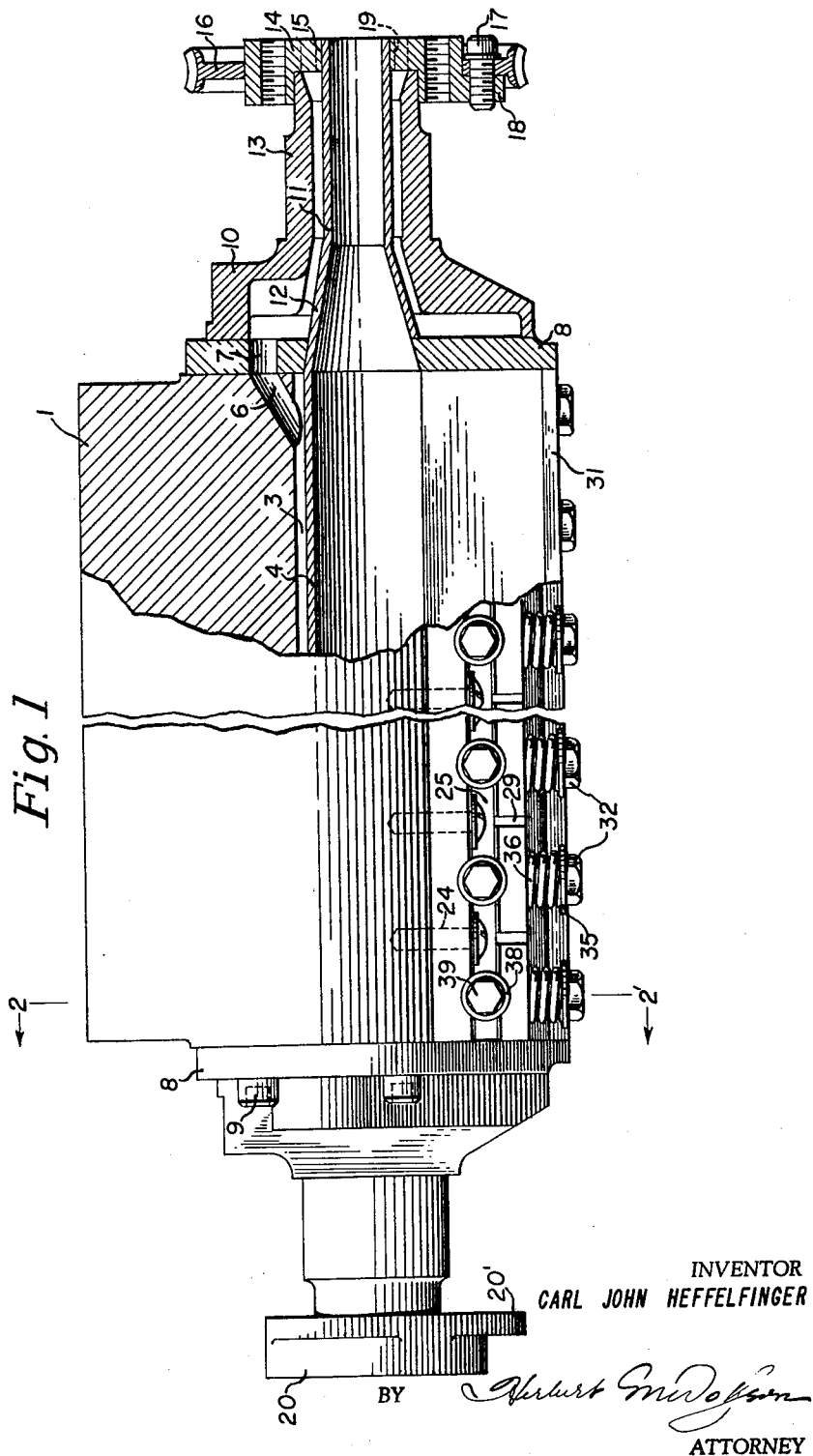

April 9, 1963  C. J. HEFFELFINGER  3,084,385
EXTRUSION APPARATUS

Filed July 8, 1959  2 Sheets-Sheet 1

INVENTOR
CARL JOHN HEFFELFINGER

BY Herbert M. Wolfson

ATTORNEY

April 9, 1963   C. J. HEFFELFINGER   3,084,385
EXTRUSION APPARATUS
Filed July 8, 1959   2 Sheets-Sheet 2
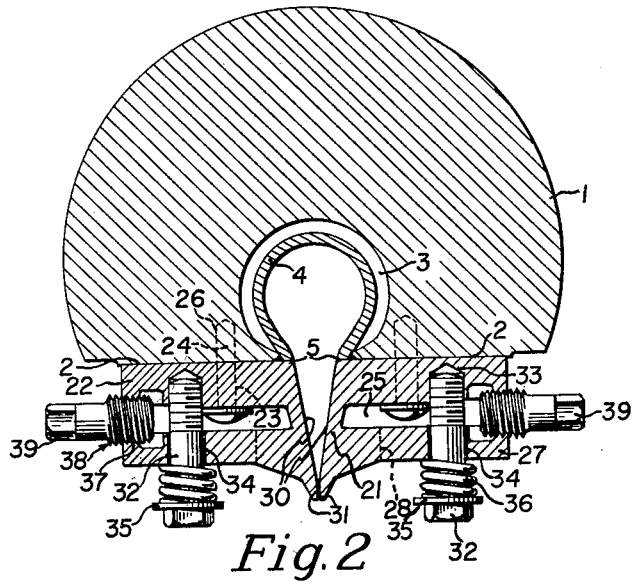
Fig. 2
Fig. 5
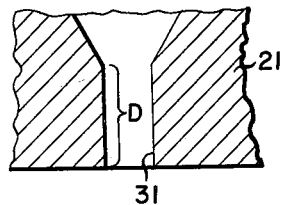
Fig. 3
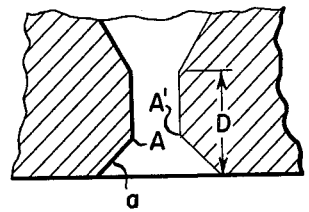
Fig. 4
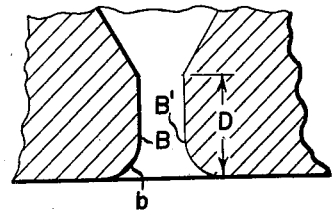
INVENTOR
CARL JOHN HEFFELFINGER
BY
ATTORNEY United States Patent Office 3,084,385
Patented Apr. 9, 1963

3,084,385
EXTRUSION APPARATUS
Carl John Heffelfinger, Circleville, Ohio, assignor to E. I. du Pont de Nemours and Company, Wilmington, Del., a corporation of Delaware
Filed July 8, 1959, Ser. No. 825,821
4 Claims. (Cl. 18—12)

This invention relates to apparatus for the continuous extrusion of films. More particularly, it relates to an improved die design for an extrusion apparatus.

In the preparation of self-supporting films from polymeric thermoplastic materials, it is usual to extrude the polymeric material in molten form through an extrusion die and to cast the extruded polymer as a film onto a quenching device. For example, molten polyethylene terephthalate is cast as a film through an extrusion die (hopper) consisting of a slot with parallel faces that are adjustable over their length.

One difficulty which arises in polyethylene terephthalate extrusion and which would also arise in the extrusion of most molten polymers through an extrusion die is that degraded polymer tends to build up on the lips of the die. This is caused by low molecular weight materials wetting the emergent lip and baking on the surface at the temperatures used. The presence of degraded polymer on the die lips produces flow deformities during extrusion. The flow deformities manifest themselves as streaks or smears in the cast film. This condition is corrected only by stopping operation and manually cleaning the die lips. A substantial loss of material and time is reflected in the high cost of producing such films.

It is an object of this invention to provide an improved apparatus for the extrusion of thin films. Another object is to provide an apparatus which produces thin films of substantially uniform thickness over extended periods of operation. Other objects will appear hereinafter.

The objects are accomplished by a novel design for the co-acting lip members which define the slot or orifice of the extrusion die, through which orifice the molten polymer is extruded.

The invention will be described as it applies to flat film in the form of sheets and the like. However, it should be understood that the invention is applicable to the extrusion of film in tubular form, as narrow ribbons or in any other form wherein the buildup of degraded polymer on the orifice-defining lip members poses a problem.

In an extrusion apparatus of the slotted die type suitable for the extrusion of molten polymeric material in the form of a film wherein the exit path of the extrudate is defined by the orifice-defining essential edges of a pair of lip members, the improvement in design that is the subject of the present invention comprises a pair of partially parallel, partially diverging essential edges of lip members of depth "D," the mutual divergence of said essential edges being for a distance equal to about 0.5–50% of the depth "D," the divergence terminating at the plane containing the lines defining the outermost edges of said lip members and the divergence of each essential edge being such that a straight line drawn from the outermost edge of the lip member to the point at which divergence starts makes an angle of 10–60 degrees with the plane defined by the extension of the parallel portions of said essential edges of the lip members.

The divergence may take the preferred form of a straight line in each lip member, i.e., chamfered or beveled edges, or each edge may be rounded to present a pair of convex surfaces. If each edge is rounded, it is preferred that the roundness be formed according to a regular geometric pattern so that the rounded surface represents a section of an ellipsoid, hyperboloid, paraboloid or cylinder.

The invention will be more clearly understood by referring to the drawings which follow, in which:

FIGURE 1 is a side elevation with parts in section of the extrusion apparatus;
FIGURE 2 is a cross-sectional view taken substantially along the line 2—2' of FIGURE 1;
FIGURE 3 is an enlarged sectional view of the essential edges of hopper lips within the scope of the present invention;
FIGURE 4 is an enlarged sectional view of another modification within the scope of the present invention of the essential edges of the hopper lips; and
FIGURE 5 is an enlarged sectional view of the essential edges of hopper lips of the prior art.

Referring now to FIGURES 1 and 2, the film extrusion apparatus comprises a main body member 1 composed of a metal having a flat bottom 2. An enlarged U-shaped longitudinal channel 3 is located in the center of the body, the spaced side walls of the channel terminating in two longitudinal edges where they meet the bottom. Fitted in channel 3 is a similarly shaped longitudinal sleeve 4. The side walls of this sleeve are welded to the body member at the longitudinal edges where the channel meets the bottom wall. The lengthwise opening 5 between the sleeve edges constitutes a wide orifice or outlet from the sleeve. The outer wall of the sleeve is spaced from the channel walls so as to provide a space for the circulation of a heat-exchange fluid. A plurality of diagonal passages 6 communicate with said space and with horizontal passages 7 in end plates 8 which are held to body member 1 by means of bolts 9. Affixed to each end plate by a weld joint is a bell-shaped hub 10 which is adapted to receive a metal tube 11 having a flared or frustroconical portion 12 the inner end of which abuts the end of sleeve 4. The hub has a smooth cylindrical portion 13 which is journalled in a suitable bearing on a frame (not shown). The end of the hub is shaped to receive a cap 14 which has a hole 15 interfitting with the outer surface of the tube. This cap can be fixed to the hub by means of screw threads, a weld, or other suitable means, or it can be force-fitted onto the hub. A worm gear 16 is placed over one cap and attached to it by a suitable means, for example by means of screw 17 threadably engaged with lug 18 on the collar. The outer walls of tube 11 are spaced from the inner walls of the bell-shaped hub for the circulation of a heat-exchange fluid. A plurality of openings 19 are provided in the ends of the cap and they communicate with a suitable source of heat-exchange fluid.

The other hub has a collar 20 with a lug 20' which can be fastened to a frame member after the hubs and associated extrusion device are adjusted, by means of the worm gear and associated means (not shown), to the desired position.

Beneath the body member and fastened thereto on each side of the lengthwise slot opening 5 in the channel sleeve, there are disposed two co-acting lip members 21 which are U-shaped and substantially identical in construction except that they are reversed in position. The upper arm 22 of each lip member 21 has a flat upper surface which fits against the flat bottom surface 2 of the body member 1. The upper arm is provided with a row of holes 23 preferably uniformly spaced through which extend screws 24. The flat inner heads of the screws contact the inner surface of the upper arm and the heads are disposed in lateral open-ended slot 25. These screws are threadably engaged with suitable threaded holes 26 in the bottom surface of the body member.

In bottom arm 27 immediately beneath each screw head is a hole 28 for the insertion of a tool to adjust the screws. A narrow lateral slot 29 extends from each hole to the outer edge of the lower arm of the U-shaped member 21.

The bottom web or inner end walls 30 of each lip member 21 slants for most of its length and together they form a tapered orifice to lead fluid from the channel sleeve to the orifice-defining lip portions or essential edges 31 of the end walls of the lip members 21.

Screws 32 which are threadably engaged in respective holes 33 in the upper arm extend through similarly spaced holes 34 (of larger diameter than the screws) in bottom arm 27. Between the head of each screw 32 and the outer surface of the arm is a washer 35 and a coil spring 36.

The open ends of slot 25 (i.e., between the upper arm 22 and bottom arm 27) have threaded arcuate portions 37 in the surfaces of such arms. These threaded arcs have their bisecting vertical plane passing through the center of screws. Threadably engaged with the arcuate portions are tapered screws 38 having polygonal shaped ends 39 adapted to receive a tool (not shown) for adjusting them toward or away from the longitudinal axis of the extrusion orifice. Each spring insures that each segment of the lower arm between narrow lateral slots 29 is always in contact with the tapered screw in the central part of such segment. The taper of the thread, the pitch of the thread and the lever ratio can be selected to give the desired mechanical advantage between screw rotation and lip movement. While in the preferred aspect of the invention there are two adjustable extrusion orifice-defining members, one of these can be made solid and nonflexible.

In assembling the device, the lip members 21 are fastened in the body member by first aligning the essential edges of the lips along an axis at approximately the spacing desired and then tightening the screws 24. The width of the slot opening between the lips in each segment between narrow slots 29 is measured carefully. Tapered screws 38 are then adjusted to correct for any deviations from a straight line.

FIGURE 5 is an enlarged sectional view of the essential orifice-defining edges of the lip members 21, as known heretofore in the prior art. It will be noted that the orifice-defining edges 31 are flat and mutually parallel throughout the depth "D."

FIGURE 3 is an enlarged section showing the same orifice-defining portion of lip members 21 as in FIGURE 5 but constructed in accordance with the preferred mode of the present invention. The orifice-defining essential edges 31 are mutually parallel for a distance less than the total depth "D." At points A and A′, the lip portions start to mutually diverge. The angle of divergence "a" being from 10–60 degrees. The distance over which the essential orifice-defining edges of the lip members diverge should be less than one-half of the total depth "D" of the essential edges, i.e., less than 50% of "D." Divergence for a distance greater than 50% of "D" provides too low a pressure drop across the lip and produces varying flow patterns along the length of the orifice, i.e., across the width of the extruded film. Both of these factors yield non-uniform, unacceptable films. The minimum distance of divergence is preferably 2% of the total depth "D" of the essential edges. However, divergence for a distance as low as 0.5% of "D" will still produce some improvement in the smoothness of the extrusion operation.

FIGURE 4 represents another embodiments wherein the edges have been rounded to form a section of a cylinder. However, the mutually divergent portions starting at B and B′ and the angle of divergence "b" should be the same as for FIGURE 3. That is, the lip portions should diverge over a distance equal to 0.5–50% of the total depth of their essential edges and at an angle of 10–60 degrees.

The principles and practice of the present invention will be more clearly understood by referring to the examples which follow. Although these examples relate to the extrusion of polyethylene terephthalate film, other kinds of materials can also be extruded in the apparatus of the present invention with the same success obtained using polyethylene terephthalate. Among such materials are film-forming polymers such as polyethylene, polyvinyl chloride, copolymers of vinyl chloride and vinyl acetate, polyvinyl fluoride, polymethyl methacrylate, polystyrene, regenerated cellulose, cellulose acetate, cellulose propionate, cellulose acetate butyrate, ethyl cellulose, rubber hydrochloride, etc.

EXAMPLE 1–3

In Examples 1–3, polyethylene terephthalate polymer prepared as described in U.S. Patent No. 2,465,319 to Whinfield and Dickson was continuously extruded at a rate of about 1,000 pounds/hour at a temperature of 280° C. through an extrusion die of conventional design to form film having a thickness of 5–20 mils. The geometry of the orifice-defining essential edges of the die lips was modified in Examples 1–3, in accordance with the present invention. The total depth of the exit orifice, i.e., "D," was 0.125″. In Example 1, the lips mutually diverge to form a cylindrical (rounded) surface similar to that illustrated in FIGURE 4 of radius 0.0078″; in Example 2, to form a cylindrical surface similar to that illustrated in FIGURE 4 of radius 0.0156″; and in Example 3, to form a planar (chamfered) surface as illustrated in FIGURE 3 of depth 0.0156″ having an angle of chamfer of 30 degrees. As a control, the exit path defining surface of the die lips (the effective essential edge or land) having a depth of 0.125″ was conventional, i.e., of the square geometry shown in FIGURE 5.

The smoothness or continuity of operation for each case is given in Table I. The extrusion operation was stopped in order to clean the die lips when unreasonable streaks or smears appeared in the cast film.

Table I

| Example | Distance of Divergence (Percent D) | Angle of Divergence (Degrees) | Average Number of Lip Cleanings Per 24-hour day |
| --- | --- | --- | --- |
| 1 | 6.25 | 45 | 0.4 |
| 2 | 12.4 | 45 | 0.8 |
| 3 | 12.5 | 30 | 0 |
| Control | 0 | 0 | 4.0 |

EXAMPLES 4–7

In order to effect a simultaneous comparison between the lip geometry of the present invention and the conventional square lip geometry under identical process conditions, a special extrusion die was constructed wherein the orifice-defining lip structure was 21″ in length, the geometry of the exit-defining lips differing over three 7″ sections. One edge section had a 15° chamfer with a chamfer depth of 0.0156″; the center section, a conventional (square) lip geometry; and the other edge section, a 30° chamfer with a chamfer depth of 0.0156″, the total depth of the orifice-defining essential edge being 0.125″.

Polyethylene terephthalate polymer was extruded continuously through this special extrusion die over periods of time ranging from 1.5–8.5 hours, with the temperature of the molten polymer and the extrusion rate being varied to simulate a range of process conditions. Table II, below, lists the incidence of smears (average number of smears per hour) for polymer extruded through each of the three sections of the extrusion die described above.

*Table II*

| Ex. | Lip Geometry of Section | Polymer Extruded (lbs./hr.) | Temperature of Extrusion (° C.) | Length of Run (Hr.) | Average No. of Smears per Hour |
|---|---|---|---|---|---|
| 4 | 15° chamfer | 150 | 290 | 8.5 | 1.8 |
|   | 30° chamfer | 150 | 290 | 8.5 | 4.3 |
|   | square | 150 | 290 | 8.5 | 14.5 |
| 5 | 15° chamfer | 150 | 280 | 2.5 | 0 |
|   | 30° chamfer | 150 | 280 | 2.5 | 0 |
|   | square | 150 | 280 | 2.5 | 14 |
| 6 | 15° chamfer | 100 | 280 | 1.5 | 0.5 |
|   | 30° chamfer | 100 | 280 | 1.5 | 0.5 |
|   | square | 100 | 280 | 1.5 | 12 |
| 7 | 15° chamfer | 100 | 290 | 6.0 | 0 |
|   | 30° chamfer | 100 | 290 | 6.0 | 0.25 |
|   | square | 100 | 290 | 6.0 | 2 |

EXAMPLE 8

Polyethylene terephthalate polymer was prepared as in Example 1. The polymer was extruded at a temperature of 280° C. through a conventional extrusion die with the modification that the essential edges at the exit of the die lips were chamfered at a 30° angle with a chamfered depth of 0.0156", the total depth of the orifice-defining essential edges being 0.125". The lip opening was 0.035". Test runs of 24 hours' duration were made. Results of the performance of this extrusion die are listed in Table III compared to control runs in which an extrusion die with orifice-defining lips of regular square geometry was used.

*Table III*

| Test Run | Die Lip Geometry Employed | Rate of Polymer Extruded/hour | Thickness (gauge) of Cast Film (mils) | Number of Lip Cleanings per 24 hrs. | Average Streak Grade[1] per 24 hours |
|---|---|---|---|---|---|
| Controls: |  |  |  |  |  |
| A' | Square | 900 | 5–10 | 4 | 2.1 |
| B' | do | 1,000 | 10 | 6 | 2.1 |
| C' | do | 1,000 | 10 | 8 | 3.5 |
| D' | do | 1,000 | 10 | 8 | 2.2 |
| E' | do | 1,000 | 10 | 10 | 4.4 |
| F' | do | 1,000 | 10 | 5 | 3.4 |
| Example 8: |  |  |  |  |  |
| A | 30° chamfer | 1,000 | 10–15 | 0 | 0.12 |
| B | do | 1,100 | 5–15 | 0 | 0.82 |
| C | do | 1,000 | 15 | 0 | 0.0 |
| D | do | 1,000 | 15 | 0 | 0.0 |
| E | do | 1,000 | 10–15 | 0 | 0.2 |
| F | do | 1,000 | 10 | 0 | 0.39 |

[1] Streak grade—The incidence of streaks occurring in the cast film was noted and the film graded from 0–5 according to the severity of streak incidence; a streak grade of 0 indicating no streak formation.

EXAMPLE 9

Polyethylene terephthalate polymer prepared as described in Example 1 was continuously extruded through a conventional extrusion die in which the exit defining lips (the essential edges of the lip members) of the die had a cylindrical configuration with a radius of 0.0156". The extrusion die lip opening was 0.013". The depth of the essential edge was 0.1094". As a control, the polyethylene terephthalate polymer was melt extruded through an extrusion die having the conventional square exit lip geometry.

The comparison of the results obtained in several tests using these two geometric configurations is summarized in Table IV.

*Table IV*

| Die Lip Geometry Employed | Rate of Polymer Extruded (lbs./hr.) | Temperature of Extrusion (° C.) | Smear Frequency (average number of smears per hour) |
|---|---|---|---|
| Square | 150 | 290 | 135 |
| Rounded | 150 | 290 | 1 |
| Square | 150 | 285 | 140 |
| Rounded | 150 | 285 | 4.3 |
| Square | 150 | 280 | 170 |
| Rounded | 150 | 280 | 19 |
| Square | 150 | 290 | 355 |
| Rounded | 150 | 290 | 13 |
| Square | 150 | 290 | 94.5 |
| Rounded | 150 | 290 | 5.8 |
| Square | 100 | 290 | 137 |
| Rounded | 100 | 290 | 6.8 |

Having fully disclosed the invention, what is claimed is:

1. In an extrusion apparatus for the extrusion of molten polymeric material in the form of a film wherein the exit path of the extrudate is defined by the orifice-defining essential edges of a pair of lip members, the improvement which comprises a pair of lip members, the essential edges of said lip members being partially parallel and partially diverging, the divergence of said essential edges being for a distance equal to about 0.5–50% of the total depth of said essential edges, the parallel portions of said essential edges being from about 50–99.5% of the total depth of said essential edges, said divergence terminating at the plane containing the lines defining the outermost edges of said lip members, the divergence of each essential edge being such that a straight line drawn from the outermost edge of the lip member to the point at which divergence starts makes an angle of 10–60 degrees with the plane defined by the extension of the parallel portions of said essential edges of the lip members.

2. An extrusion apparatus as in claim 1 wherein the divergence of the essential edges of the lip members is in the form of chamfered edges.

3. An extrusion apparatus as in claim 1 wherein the divergence of the essential edges of the lip members is in the form of cylindrically rounded edges.

4. In an extrusion apparatus for the extrusion of molten polymeric material in the form of a film wherein the exit path of the extrudate is defined by the orifice-defining essential edges of a pair of lip members, the improvement which comprises a pair of lip members, the essential edges of said lip members being partially parallel and partially diverging, the divergence of said essential edges being for a distance equal to about 2–50% of the total depth of said essential edges, the parallel portions of said essential edges being from about 50–98% of the total depth of said essential edges, said divergence terminating at the plane containing the lines defining the outermost edges of said lip members, the divergence of each essential edge being such that a straight line drawn from the outermost edge of the lip member to the point at which divergence starts makes an angle of 10–60 degrees with the plane defined by the extension of the parallel portions of said essential edges of the lip members.

References Cited in the file of this patent

UNITED STATES PATENTS

| 1,800,180 | Day | Apr. 7, 1931 |
| 2,341,749 | Webb | Feb. 15, 1944 |
| 2,659,103 | Merritt | Nov. 17, 1953 |
| 2,677,148 | Webb | May 4, 1954 |
| 2,765,492 | Velvel | Oct. 9, 1956 |
| 2,923,969 | Thorpe | Feb. 9, 1960 |

FOREIGN PATENTS

| 451,864 | Canada | Oct. 12, 1948 |